April 18, 1933.　　　F. S. FARLEY　　　1,904,285
METHOD AND MACHINERY FOR THE MANUFACTURE
OF ACOUSTICAL BOARD AND THE LIKE
Filed Sept. 7, 1929　　　8 Sheets-Sheet 2
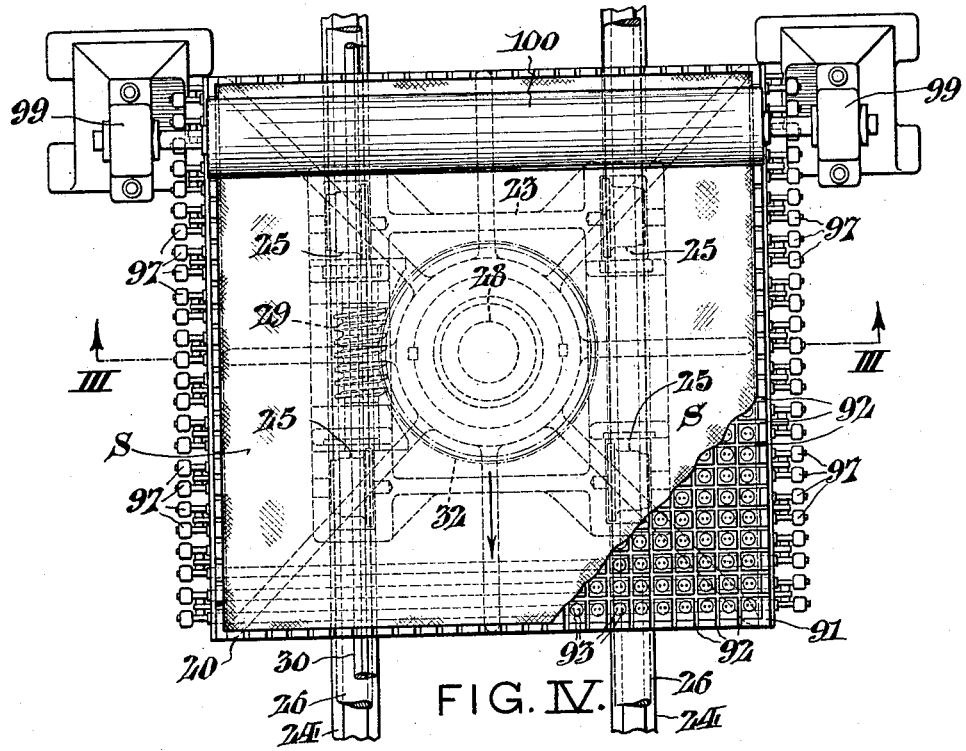
FIG. IV.
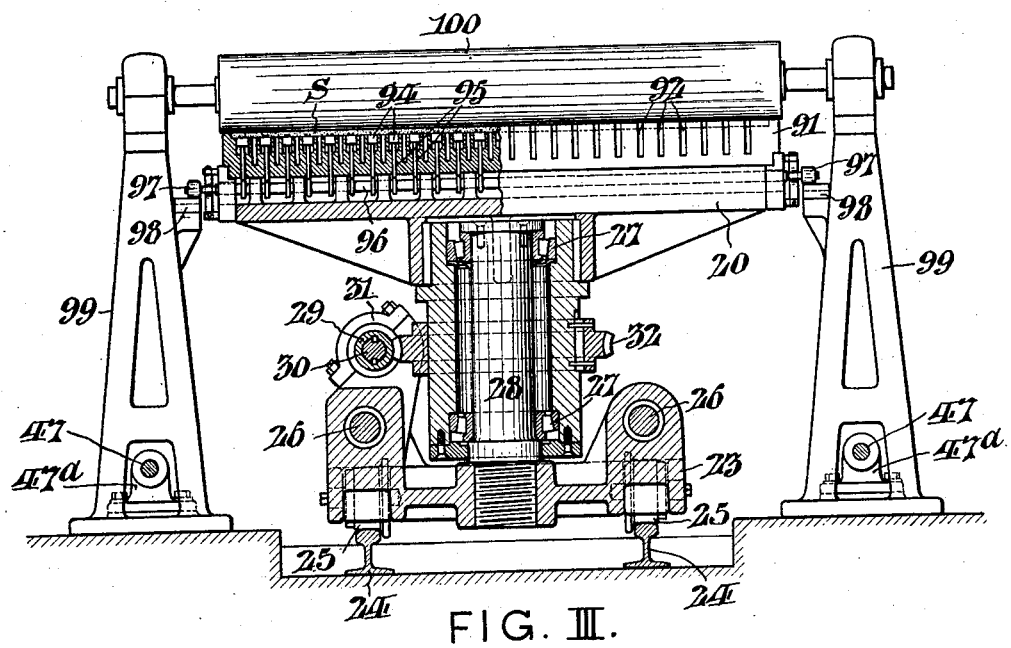
FIG. III.
INVENTOR
BY Francis S. Farley
ATTORNEYS

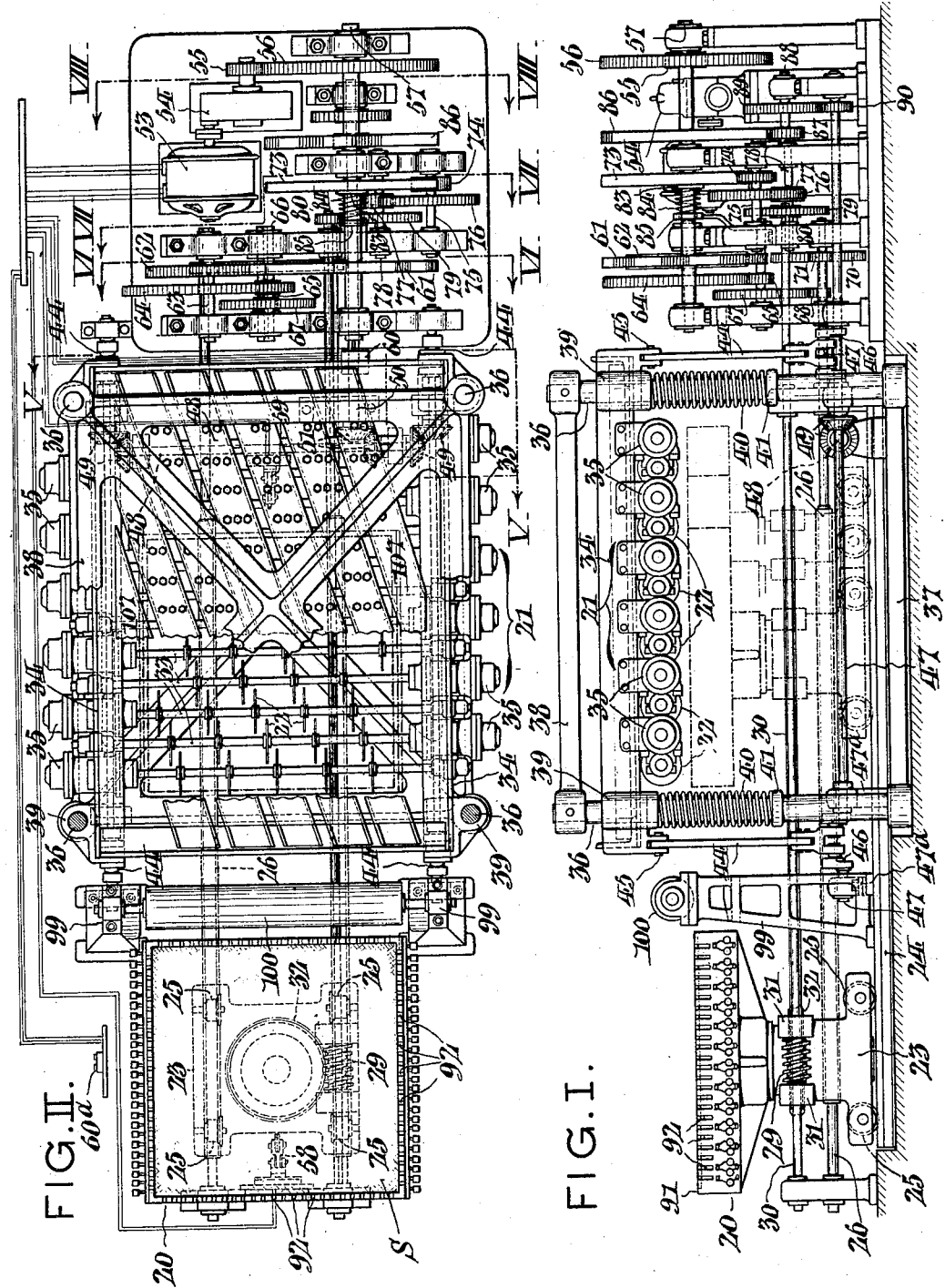

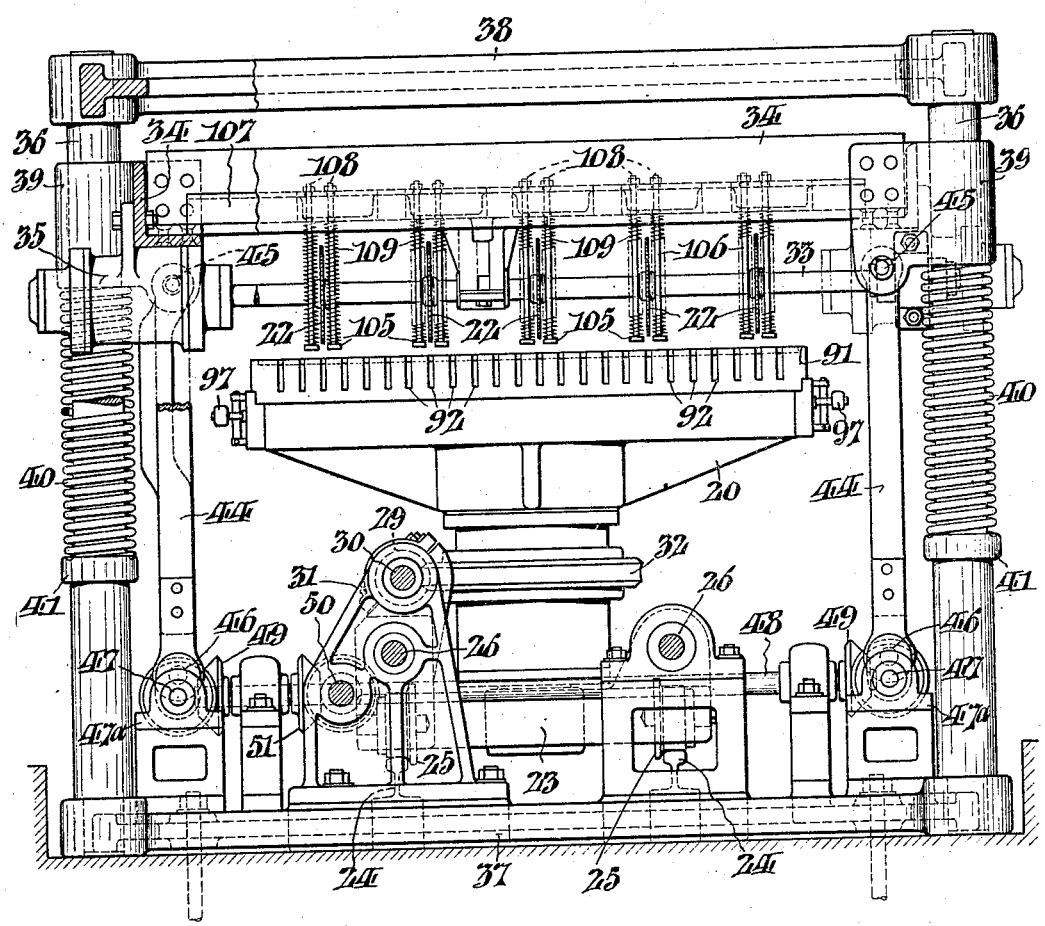

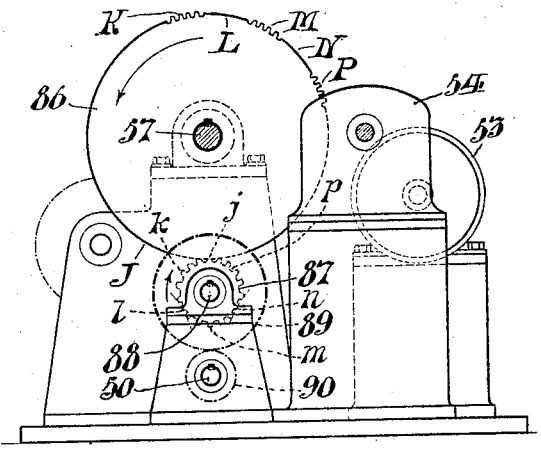
FIG.VIII.
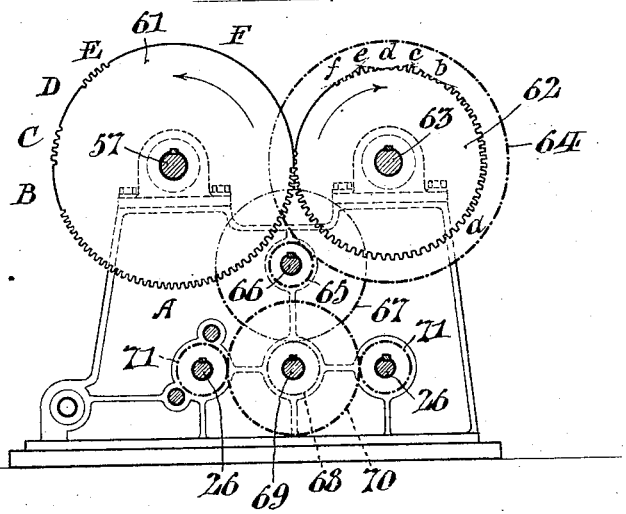
FIG.VI.
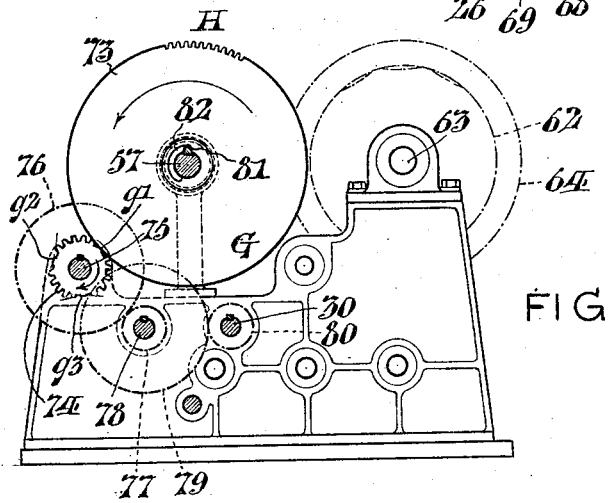
FIG.VII.
INVENTOR
Francis S. Farley
BY Fraley Paul
ATTORNEYS.

April 18, 1933.                F. S. FARLEY                    1,904,285
              METHOD AND MACHINERY FOR THE MANUFACTURE
                   OF ACOUSTICAL BOARD AND THE LIKE
                       Filed Sept. 7, 1929              8 Sheets-Sheet 5
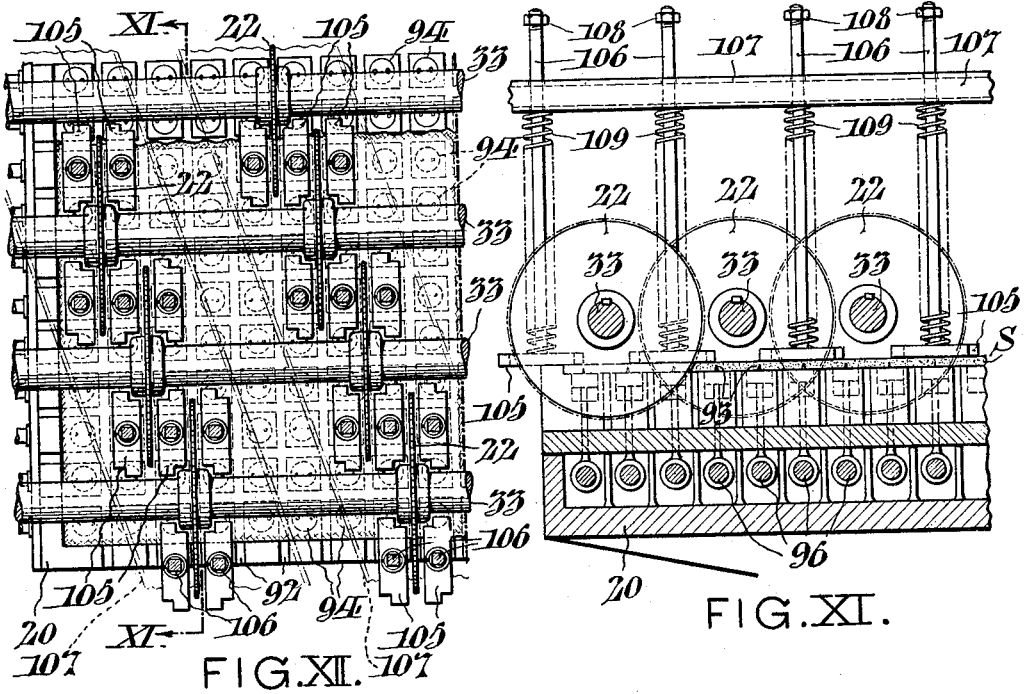
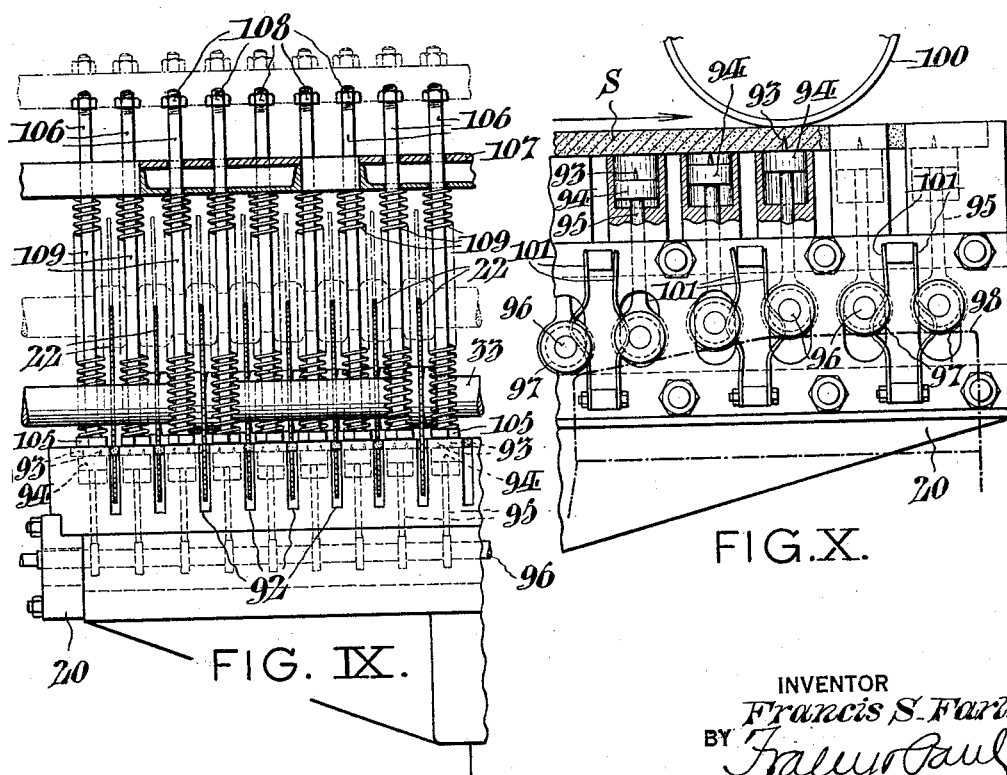
INVENTOR
Francis S. Farley
BY
ATTORNEYS.

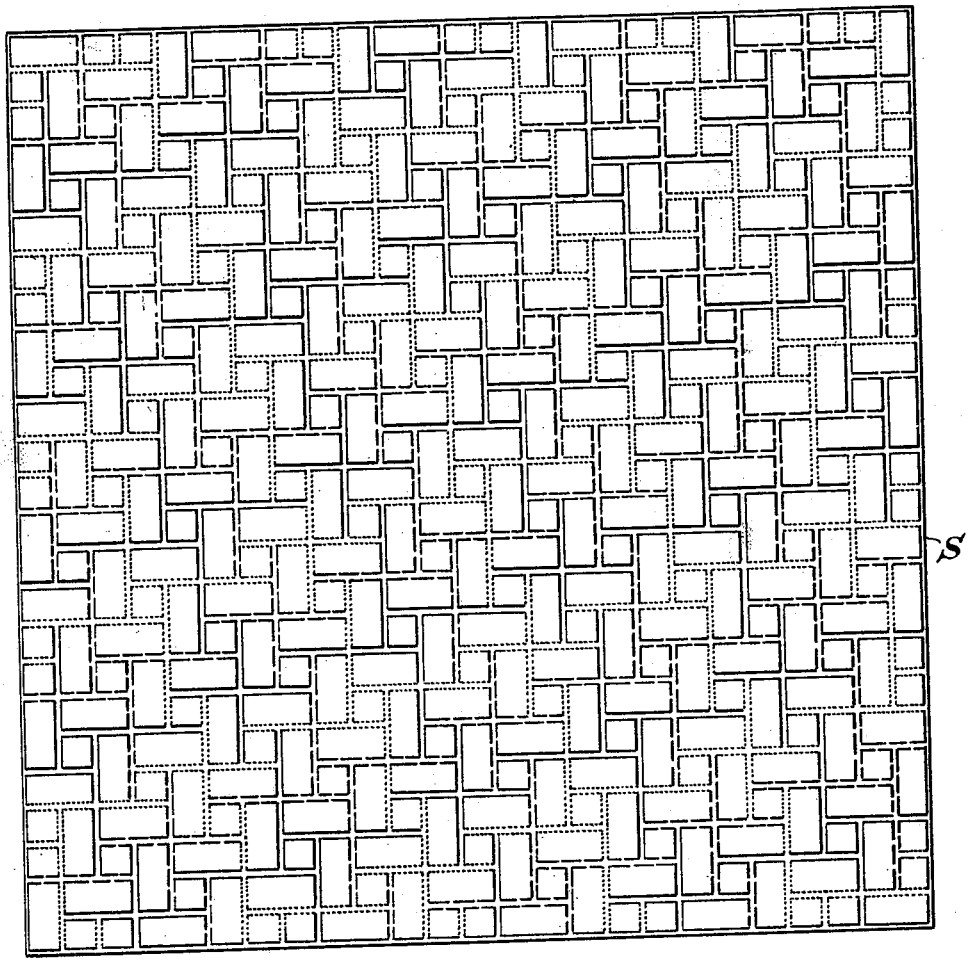
FIG. XIII.
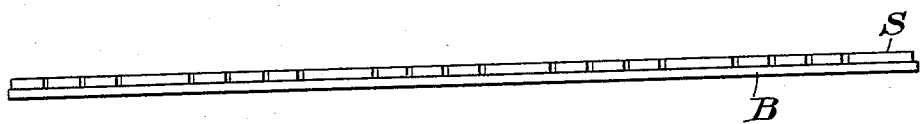
FIG. XIV.
FIG XIII a
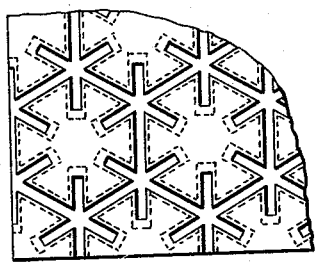
INVENTOR
Francis S. Farley
BY
ATTORNEYS.

April 18, 1933. F. S. FARLEY 1,904,285
METHOD AND MACHINERY FOR THE MANUFACTURE
OF ACOUSTICAL BOARD AND THE LIKE
Filed Sept. 7, 1929 8 Sheets-Sheet 7
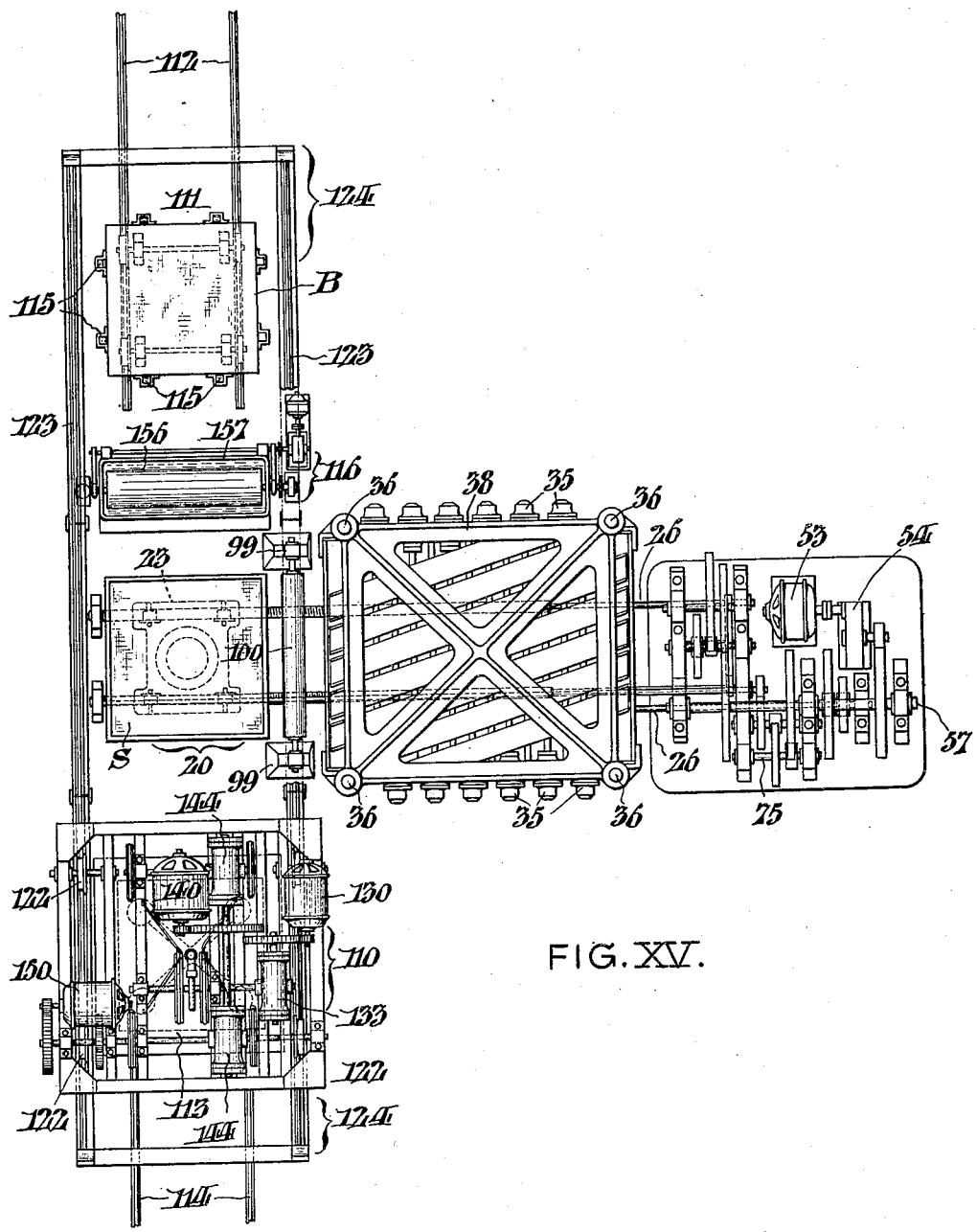
FIG. XV.
INVENTOR
Francis S. Farley
BY
ATTORNEYS.

April 18, 1933. F. S. FARLEY 1,904,285
METHOD AND MACHINERY FOR THE MANUFACTURE
OF ACOUSTICAL BOARD AND THE LIKE
Filed Sept. 7, 1929 8 Sheets-Sheet 8
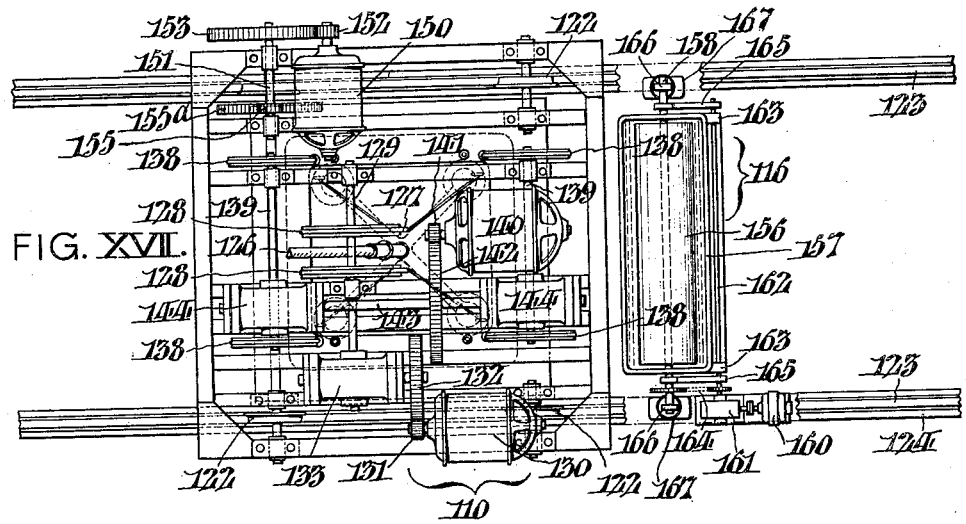
FIG. XVII.
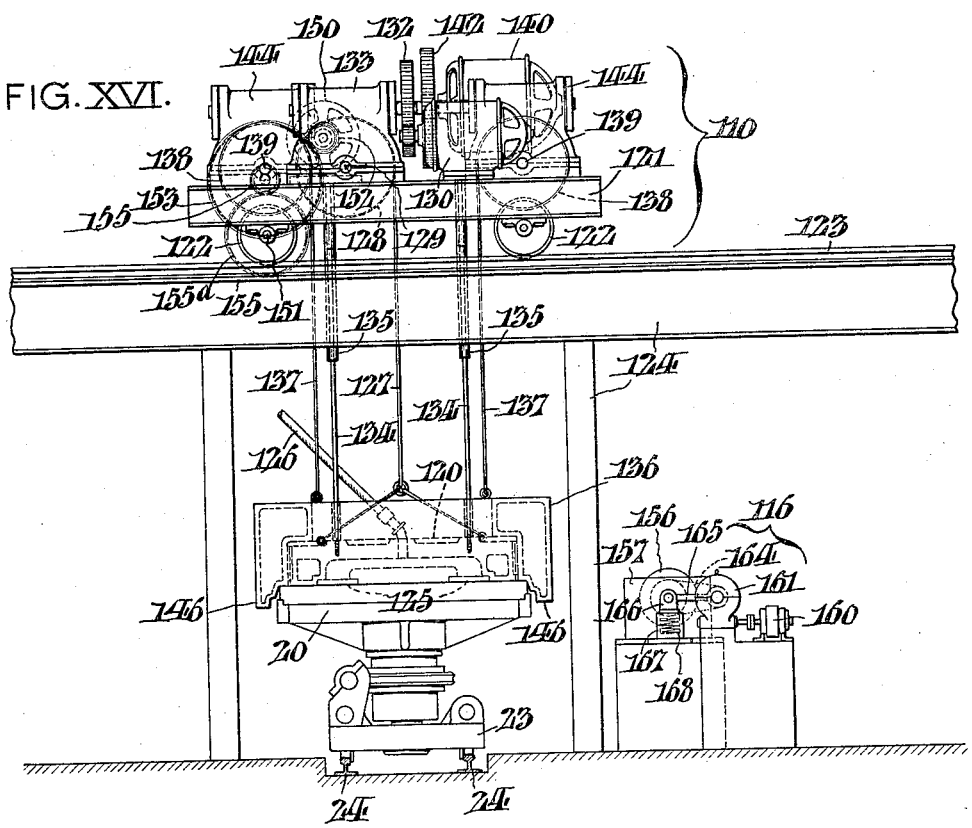
FIG. XVI.
INVENTOR
Francis S. Farley
BY
ATTORNEYS Patented Apr. 18, 1933

1,904,285

UNITED STATES PATENT OFFICE

FRANCIS S. FARLEY, OF TRENTON, NEW JERSEY, ASSIGNOR, BY MESNE ASSIGNMENTS, TO JOHNS-MANVILLE CORPORATION, OF NEW YORK, N. Y., A CORPORATION OF NEW YORK

METHOD AND MACHINERY FOR THE MANUFACTURE OF ACOUSTICAL BOARD AND THE LIKE

Application filed September 7, 1929. Serial No. 391,088.

The present invention relates to acoustical board and the like, and methods and machinery for its manufacture. This board is useful for the walls and ceilings of auditoriums and other places or rooms where satisfactory audition is important. Such board may also be found a desirable surfacing, on account of thermo-insulative or æsthetic considerations, even in cases where audition is unimportant.

For the purposes of my invention, it is of advantage that the board should have a broken surface. Accordingly, the form of board here illustrated and described has a multiplicity of recesses, grooves or channels in its surface, which for convenience in manufacture and for æsthetic effect may form a recurrent pattern of greater or less complexity. Such a broken surface is not only pleasing to the eye, but of advantage acoustically, in preventing echoes or reverberations of sound that interfere with satisfactory audition. Either the broken surface absorbs the incident primary atmospheric waves; or it mutilates the wave front in reflection so that the reflected waves are inaudible; or, again, it suppresses or mitigates the secondary sound phenomena in some other way. I prefer to form the recesses through the action of rotary cutters, by a sawing or milling operation.

The board hereinafter shown and described is laminated, consisting of two thicknesses of material secured together,—openings to form the recesses or channels being formed in one of them, and the other serving as a backing and closing the bottoms of the recesses. The thickness containing the recesses may consist of a number of separate pieces suitably spaced and arranged to afford the recesses and to form any desired pattern. As hereinafter explained, I cut these pieces out of one sheet and maintain them in substantially their original relations to one another until they are attached to the other (backing) sheet.

In the drawings, Fig. I is a side view of a machine adapted for and embodying my invention.

Fig. II is a plan view of the same machine.

Fig. III is a view from the left of Figs. I and II, illustrating a table for supporting sheets while they are being cut, with certain parts in vertical section as indicated by the line and arrows III—III in Fig. IV.

Fig. IV is a plan view of the table and associated parts, showing a portion of a sheet on the table.

Fig. V is an elevational view, taken as indicated by the line and arrows V—V in Fig. II, showing the table in operative relation to the cutting mechanism, (part of which is omitted), and with certain parts broken away or in section.

Fig. VI is an end view of the driving mechanism for the machine shown in Figs. I and II, with a shaft in section as indicated by the line and arrows VI—VI in Fig. II.

Fig. VII is a similar view of other parts of the driving mechanism, taken as indicated by the line and arrows VII—VII in Fig. II.

Fig. VIII is a similar view of still other parts of the driving mechanism, taken as indicated by the line and arrows VIII—VIII in Fig. II.

Fig. IX is a fragmentary sectional view similar to Fig. V, but showing more of the cutters and showing a sheet being cut.

Fig. X is a fragmentary edge view of the table with parts in vertical section, illustrating the action of anchoring a sheet to the table.

Fig. XI is a view similar to Fig. IX, but at right angles.

Fig. XII is a plan view corresponding approximately to Fig. IX.

Fig. XIII is a plan view of a sheet of acoustical board made on my machine.

Fig. XIII—A is a fragmentary plan section of a modified form of product.

Fig. XIV is an edge view of the sheet.

Fig. XV is a plan view illustrating the machine of Figs. I and II associated with additional mechanism for handling the sheet material employed.

Fig. XVI is an elevation from the left of Fig. XV, showing a somewhat different relation of parts from that shown in Fig. XV; and Fig. XVII is a plan view corresponding to Fig. XVI, with certain parts broken away and omitted.

Figs. I and II afford a general view of a machine for cutting a sheet of fibre board or the like into pieces that are to be attached to a backing sheet of fibre board or the like to form a laminated sheet of acoustical board, such as above described. As here shown, this machine comprises a table 20 to receive and support the sheet S and a gang 21 of rotary disk-like cutters or saws 22 to operate on the sheet. The table 20 receives the sheet S when the table is in the position shown at the left of Figs. I and II, and it is then moved to the right under the saw gang 21, as indicated by the various dot-and-dash lines in Fig. I. For this purpose, the table 20 is mounted on a carriage 23 adapted to travel along ways or tracks 24, being provided with wheels 25 to run on the tracks. The carriage 23 may be moved back and forth along the tracks 24 by a pair of endless screws or worm shafts 26 extending through the base of the carriage and in threaded engagement therewith,—as best shown in Figs. I and III. Provision may be made for taking cuts in the sheet S in various angular positions, as may be required by the various patterns which it may be desired to produce, by mounting the table 20 to turn on the carriage 23, as by means of the conical anti-friction roller bearings 27 in Fig. III. As shown in Fig. III, the anti-friction bearings 27 are mounted on a stud 28 upstanding from the base of the carriage 23. The table 20 may be turned on the carriage 23 either while the carriage is at rest, or while it is moving along the ways 24, by means of a worm 29 splined to slide along a shaft 30 extending through bearing lugs 31 on the carriage structure. As shown in Figs. I, II, III and IV, this worm 29 engages a worm wheel 32 on the table structure 20.

The saws 22 of the saw gang 21 are arranged at suitable intervals on a number of transverse shafts 33 which are mounted in bearings on a frame 34. Generally, I prefer to move the saw gang 21 up and down to make the cuts in the sheet S, rather than to raise and lower the sheet S and the table 20 for this purpose. Accordingly, the source of power for the saw shafts 33 is preferably provided directly on the frame 34, comprising, as shown, a separate (electric) motor 35 for each shaft. The motors 35 for alternate shafts 33 are at opposite sides of the frame, so as to permit closer spacing of the shafts,—even so close that the saws shall interlap as in Fig. II. They are supported beneath the angular frame sides by upstanding brackets bolted to the outer surfaces of the frame sides (Fig. V). As here shown, the frame 34 is mounted to slide along upright ways formed by vertical columns or posts 36, which are interconnected and definitely spaced by horizontal frame structures 37, 38 at their lower and upper ends. The uprights 36 extend through guide openings in lateral lugs 39 on the frame 34. Helical compression springs 40 are mounted around the uprights 36, between the frame lugs 39 and shoulders formed by flanges 41 on the uprights. These springs serve to sustain and balance the weight of the whole saw gang 21, including the frame 34, and to cushion its downward movements.

The springs 40 automatically act to keep the saw gang 21 raised to such a height that the saws 22 clear the work on the table 20, as shown in Figs. I and V. To make a cut, however, the saw gang 21 is drawn downward against the springs 40 by pitmen 44 whose upper ends are pivoted to the frame 34 at 45, and whose lower ends are operated by cranks 46 on longitudinal shafts 47 mounted in upstanding bearing lugs 47a. As shown, there is a pitman 44 for each corner of the frame 34, and each shaft 47 has cranks 46, 46 for the two pitmen at its side of the machine. The shafts 47 are positively geared together and driven by a transverse shaft 48, by means of bevel gears 49. As shown in Figs. I and V, the shaft 48 is in turn driven from a longitudinal shaft 50, by means of bevel gears 51. Thus the four corners of the frame 34 are concurrently and correspondingly moved, and the saw gang 21 always kept perfectly level. This even action is not, indeed, impaired by failure of a spring 40, since the pitmen 44 will positively raise the saw gang, as well as lower it.

The carriage-shifting, table-turning, and saw gang-moving shafts 26, 30, 50 may be operated in proper correlation in any suitable manner. As shown in Figs. I and II, they are driven from a common reversible electric motor 53, through suitable gearing at the right-hand end of the machine,—see also Figs. VI, VII and VIII. The motor 53 acts through a reduction gearing 54, a pinion 55, and a gear 56 to drive a slow-speed longitudinal main shaft 57, from which the various parts are all driven. As hereinafter described, there are three sets of intermittent gearing driven from the shaft 57, one for shifting the table 20 with the carriage 23, one for turning the table on the carriage, and one for raising and lowering the saw gang 21. Figs. I, II, VI, VII and VIII show all of these gearings in their condition at the beginning of a cycle of operation, with the table 20 at its full-line position of Fig. I, but about to start to move toward the right. At the extreme limit of movement of the table 20 each way, the motor 53 is stopped and reversed to return the table and repeat the previous set of operations in reverse order. This may be done automatically, by means of a delayed action limit switch mechanism diagrammatically indicated at 60, and actuated by the rotation of the shaft 57. There is also indicated a system of electrically actuated emergency limit switches 58 and 59 as an additional protection against overtravel of the table 20. In addition, there is shown a push button control 60a for starting and stopping the whole machine when desired.

Fig. VI illustrates the drive of the carriage-shifting shafts 26, 26. As here shown, the shaft 57 carries a gear 61 that drives a gear 62 on a short shaft 63, which, in turn, carries a gear 64 that meshes with a pinion 65 on another short shaft 66. A gear 67 on the shaft 66 meshes with a pinion 68 on still another shaft 69, and this shaft 69 has a gear 70 meshing with pinions 71, 71 on the two shafts 26, 26. As shown in Figs. I, II and VII, the gears 61, 62 form an intermittent gearing. The driving gear 61 has a long toothed arc A that cooperates with the toothed arc $a$ of the gear 62 to move the table 20 from the full-line position at the left of Fig. I to the first dot-and-dash position; a short plain arc B that co-operates with a correspondingly shaped recess $b$ in the gear 62 to permit and compel a dwell of the table 20 in the first dot-and-dash position, while the first cut is made by the saw gang 21; a short toothed arc C that cooperates with the teeth of the gear 62 at $c$ to shift the table to the second dot and dash position; another short plain arc D that cooperates with a correspondingly shaped recess $d$ in the gear 62 to permit and compel a dwell of the table 20 in the second dot and dash position, while the second cut is made by the saw gang 21; a short toothed arc E that co-operates with the teeth of the gear 62 at $e$ for the shift of the table 20 to the third dot and dash position; and a long plain arc F that cooperates with a correspondingly shaped recess $f$ in the gear 62 to permit and compel a dwell of the table 20 in the third dot and dash position, while the last cut is made by the saw gang,—and the table 20 turned 90° preparatory to the second series of cuts by the saw gang 21.

Fig. VII illustrates the drive of the table-turning shaft 30. As shown, the shaft 57 carries a gear 73 that drives a pinion 74 on a shaft 75, which, in turn, carries a gear 76 that meshes with a pinion 77 on a shaft 78. A gear 79 on the shaft 78 meshes with a pinion 80 on the shaft 30. As shown in Figs. I, II, and VII, the gears 73, 74 form an intermittent gear. The driving gear 73 has a major plain portion G that cooperates with correspondingly shaped recesses $g^1$, $g^2$, $g^3$, in the pinion 74 to permit and compel the table 20 to remain in one angular position throughout each series of cutting operations, and a minor toothed portion H that cooperates with the pinion teeth in turning the table 20 through a 90° angle after each series. As shown in Fig. VII, the gear 73 is not fast to the shaft 57, but has a lost motion connection therewith, consisting of a key 81 fast in the shaft 57 and an arcuate opening 82 in the gear 73 that allows the gear 73 to remain stationary after each reversal of the motor 53 until the shaft 57 has turned about 140°. This pause of the driving gear 73 occurs after the table 20 reaches its extreme (dot and dash) right-hand position in Fig. I, and allows time for the final cut to be made in the sheet S before the table is turned 90° in preparation for the second series of cutting operations; it also occurs after the return of the table 20 to the full-line position at the left of Figs. I and II, when motor 53 is restarted to cut the next sheet S.

As shown in Figs. I and II, there is a friction device for holding the gear 73 stationary while the key 81 travels the length of its arcuate opening 82 in the gear, so that the gear shall not start to turn by mere friction with the shaft 57. This device consists of a collar 83 around the shaft 57 for engaging one side of the gear hub and a helical compression spring 84 around the shaft that acts against a fixed stationary bracket 85 to press the collar 83 against the gear hub.

The drive of the saw-gang lowering and raising shaft 50 is illustrated in Fig. VIII. As shown, the shaft 57 carries a gear 86 that meshes with a pinion 87 on a shaft 88, which, in turn, carries a gear 89 that meshes with a pinion 90 on the shaft 50. As shown in Figs. I, II and VI, the gears 86, 87 form an intermittent gear. The driving gear 86 has a major plain portion J that cooperates with a correspondingly shaped recess $j$ in the pinion 87 to permit and compel the saw gang 21 to remain in its raised position (Fig. I) during a period including the travel of the table 20 between its full-line position at the left of Fig. I, and its first dot-and-dash position. The driving gear 86 also has a short toothed arc K that cooperates with the pinion teeth at $k$ to lower (and raise) the saw gang 21 for the first cut; a short plain arc L that cooperates with a correspondingly shaped recess $l$ in the pinion 87 to permit and compel the saw gang 21 to remain raised during travel of the table 20 between the first and second dot-and-dash positions; another toothed arc M that cooperates with the pinion teeth at $m$ to lower (and raise) the saw gang 21 for the second cut; a short plain arc N that cooperates with a correspondingly shaped recess $n$ in the pinion 87 to permit and compel the saw gang 21 to remain raised during travel of the table 20 between the second and third dot-and-dash positions, and still another toothed arc P that cooperates with the pinion teeth at $p$ to lower (and raise) the saw gang 21 for the third cut.

It will be understood, of course, that the intermittent gears above described may be varied and changed according to the pattern to be cut,—the particular gears here shown and described being specially adapted for producing the particular pattern shown in Figs. XIII and XIV, and described hereinafter.

As shown in Figs. I, III and V, the table 20 has an upstanding margin 91 to keep a sheet S in definite, constant position on the table. To allow the saws 22 to cut through the sheet S to a sufficient length by a mere downward movement, the table 20 has slots 92 of ample depth, as shown in Figs I-V. The slots 92 are spaced according to the spacing of the saws 22, and are arranged in sets corresponding to the angular relations desired for any pattern to be produced. Accordingly, one table 20 may be replaced by another, differently slotted, when it is desired to produce a different pattern. As shown in the drawings, there are two sets of slots 92, at right angles to one another; but any desired number and angular relation of slots may, of course, be employed.

As the making of many closely spaced cuts will weaken the sheets S,—even before the cuts do actually sever it into separate pieces,—provision may be made for anchoring the sheet S at a sufficient number of points to prevent displacement of any portion. This may be done by means of pins or points 93 engaging or stuck in the sheet (Figs. IV, IX and X). As shown in Fig. IV the slots 92 divide the table top into a multitude of square upright prisms, and anchorage points 93 are provided for each square. As shown in Figs. III, IV and IX to XII, the anchorage points 93 are on movable plungers 94 that can be withdrawn with the points into corresponding chambers, or bores, in the table 20, so that the points shall not interfere with placing a sheet on the table. As shown, there are two pin points 93 on each plunger 94, so that no piece that can be cut out of a sheet on the table 20 can become angularly displaced. The plungers 94 are operated, to drive their points 93 into a sheet or withdraw them, by stems 95 extending down through the table 20 to transverse rods 96 located in corresponding vertically elongated chambers in the table. These rods 96 extend through eyes in the lower ends of the stems 95. The ends of the rods 96 project to either side of the table, and are provided with contact rollers 97 to coact with sloping cam surfaces 98 on uprights 99 adjacent the path of movement of the table to and from the saw gang 21. A large roll 100 is mounted in the uprights 99 at the point where the cams 98 will drive the points 93 into the sheet S: This roll holds the sheet down as it is pierced by the points.

Provision may be made for locking the plungers 94 in either raised or retracted position, by means of spring catches 101 mounted on the edges of the table in position to coact with each rod 96. Each catch 101 has a central boss that the rod 96 springs past when the rod is forced up or down. These catches 101 prevent accidental dropping of a plunger while the sheet is under the saws 22.

As an additional (or alternative) means of preventing displacement of the portions of the sheet S between or amongst the sawcuts, provision may be made for holding these portions down on the table 20 while the saws 22 are in action. For this purpose, there are presser feet 105 to engage the sheet S, one for each area between adjacent saws 22 and their shafts 33, as shown in Figs. V, IX, XI and XII. As shown in Fig. XII, these feet 105 are so proportioned and arranged that one or more of them partly covers each of the prisms into which the table 20 is divided by the slots 92; and hence every piece into which the sheet S can be cut on the table will be engaged and held down by at least one of these feet, so that it cannot become disengaged from the anchor points 93 while the saws are in action. The presser feet 105 may be carried by the sawgang frame 34, and are preferably yieldingly mounted on said frame 34 so as to come in contact with the sheet S about as the saws 22 reach it, or somewhat before. As shown in Figs. V, XI and XII, each presser foot 105 is mounted on a stem 106 extending up through a supporting bar 107, with a removable head (nut) 108 on its upper end. A helical compression spring 109 between the foot 105 and the bar 107 normally presses the foot down as far as permitted by the head 108, as shown in Figs. V and XI, but allows it to remain stationary during the descent of the bar 107 when the saw-gang is making a cut. As shown in Figs. II and XII, three rows of feet 105 are carried by each of the bars 107, which extend on an inclination across the frame 34, with their ends secured to the frame as shown in Fig. V.

Figs. XIII and XIV illustrate an advantageous acoustical board pattern that can be made on the table 20 shown in Fig. IV. The basis of this pattern is a square surrounded by rectangles laterally overlapping one another's ends in sequence, each rectangle bearing the same general relation to two squares at opposite sides of its opposite ends,—so that it is common to two of the elemental square and rectangle combinations or units of the pattern. Accordingly, a sheet S can be cut to this pattern by cuts of uniform length,—i. e., a length a little more than twice that of a rectangle, and a little more than four times that of a square. Each such cut, it will be observed, terminates in one of the elemental figures of the pattern,— i. e. against the side of a rectangle.

With the table of Fig. IV and the set of saws shown in Fig. II, this pattern can be produced by three sets of cuts extending in each of two directions at right angles to one another: i. e., by first making one set of cuts; then shifting the table to the right a distance equal to five times the dimensions of a square (measured along the center lines of its surrounding cuts), and making another set of cuts; then shifting the table the same distance further to the right and making a third set of cuts; and then turning the table 90 degrees and making three sets of cuts in a similar manner,—preferably returning the table to the left (after turning it) in two steps, and taking a cut before each return movement.

In Fig. XIII, the cuts of each set in each direction are indicated by lines of the same character: dashes for the first set, dotted lines for the second set, and solid lines for the third set.

The cycle of operation of the machine may be briefly described as follows:

The parts being in the positions shown in Figs. I, II and VI–VIII,—which may be regarded as the normal starting condition for the machine,—a sheet S is placed on the table 20 within its margin 91, and the switch 60a actuated to start the motor 53 and the main controlling shaft 57, and to start the saw motors 35 into continuous operation. The following steps then occur in the order set forth:

Table 20 is moved to the first dot and dash position of Fig. I,—the gear 61 driving.

Saw gang 21 is lowered to make first group of cuts,—shown in dashes in Fig. XIII,—gear 86 driving.

Table 20 is shifted to the second dot and dash position,—the gear 61 driving.

Second group of cuts—shown in dotted lines in Fig. XIII—are similarly made, gear 86 driving.

Table 20 is shifted to the third dot-and-dash position,—gear 61 driving.

Third group of cuts—shown in solid lines in Fig. XIII—are made, gear 86 driving.

Table 20 is turned 90° clockwise (Fig. II), gear 73 driving.

Delayed action limit switch 59 stops motor 53 and restarts it in reverse. Gear 73 remains stationary till shaft 57 has turned about 140°.

First group of cuts, second series—in dashes in Fig. XIII—are made at right angles to the cuts of the first series, gear 86 driving.

Table 20 is shifted back to second dot-and-dash position,—gear 61 driving.

Second group of cuts, second series—in dotted lines in Fig. XIII—are made, gear 86 driving.

Table 20 is shifted back to first dot-and-dash position,—gear 61 driving.

Third group of cuts, second series—in solid lines in Fig. XIII—are made, gear 86 driving.

Table 20 is returned back to the full line position of Fig. I, gear 61 driving, and is concurrently turned 90° counterclockwise, gear 73 driving.

The modification shown in Fig. XIII–A consists of a recurrent pattern of polygonal units formed by a multiplicity of channels, the channels bounding each unit being prolonged into adjacent units. This pattern is similar to that of Fig. XIII in that it is formed of sets of parallel channels, each channel being of equal length, but differs in that the sets are perpendicular to each other in Fig. XIII, while in Fig. XIII–A they form an angle of 60°, and three sets of parallel channels occur in the pattern in place of two sets as in Fig. XIII. The hexagonal pattern is cut in a manner analogous to that of Fig. XIII; that is, a plurality of channels comprised in one set is cut simultaneously by moving the sheet transversely relative to the disk cutters or other cutting means, and thereafter the angular relation of the direction of movement of the cutting means is changed in the transverse plane 60° so as to cut the other sets of parallel channels. If desired, this pattern or others may be made with the sides of the grooves or channels, as well as their ends undercut as indicated by dotted lines in Fig. XIII–A, by using cutters which are wedge-shaped in section.

Figs. XV, XVI, and XVII show the machine of Figs. I–XII combined with means for securing a backing sheet B to a cut sheet S or the pieces therefrom, and for supplying handling, and delivering the backing sheets and the completed acoustical board. As here shown, there is a sheet-handling apparatus 110 adapted to travel across or over the ways 26, on which travel the carriage 23 and table 20,—above the full-line position of the table 20 in Figs. I and II. There is a carrier for supplying backing sheets B, in the form of a car 111 that travels on rails 112 parallel with the path of travel of the handling apparatus 110, and a similar carrier or car 113, for removing the completed acoustical boards, that travels on rails 114 extending in the same direction as the rails 112. The supply car 111 may have side bars 115 for holding a stack of backing sheets B in vertical alignment, while the car 113 may have its top free and clear so that the completed boards may be readily stacked on it. There is also a device 116 for supplying adhesive, such as glue, for securing the backing sheet B to the sheet S or the pieces thereof.

The handling apparatus 110 (Fig. XVI) comprises a suction device or vacuum box 120 suspended from a carriage 121 adapted to travel on wheels 122 along ways or rails 123, suitably mounted on the supporting structure 124 above the height of the table 20.

The vacuum box 120 has suction mouths 125 to engage the sheet B, and is connected by a flexible conduit or vacuum hose 126 to any suitable suction-producing means. The suction device 120 may be raised and lowered by means of cables 127 extending and attached to hoisting wheels 128 fast on a transverse shaft 129 suitably mounted on the carriage 121. The shaft 129 may be driven by an (electric) motor 130 on the carriage 121, through gears 131, 132 and worm gearing indicated at 133. The suction device 120 may be definitely guided in its up and down movements by rods 134 fixed in the device 120 and telescoping in tubes 135 fixed on the carriage 121.

With the suction device 120 is associated a heavy frame-like structure 136, adapted to rest on the device 120 around its edges and press the glue-coated sheet B carried by the device 120 on the pieces of the sheet S on the table 20. This structure 136 is suspended by cables 137 extending and attached to hoisting wheels 138 fast on transverse shafts 139, 139 suitably mounted on the carriage 121. The shafts 139, 139 may be driven by an (electric) motor 140 on the carriage 121, through gears 141, 142, a longitudinal shaft 143 and worm gearing indicated at 144, 144. Thus the device 120 and the structure 136 can be raised and lowered either separately or together.

As shown in Fig. XVI, the structure 136 has depending margins 146 adapted to strike the rolls 97 and force down the bars 96 when the device 120 descends with a glued backing sheet B on a cut sheet S, thus withdrawing the pins 93 from the pieces of the sheet S and at the same time snapping the bars 96 past their catches 101 and locking the plungers 94 in their retracted lower positions (Fig. IX).

The carriage 121 can be shifted along its ways 123 by an (electric) motor 150 on the carriage. This motor 150 is connected to a transverse shaft 151 by gears 152, 153, and the shaft 151 is connected to the common axle 154 of two of the carriage wheels 122 by gears 155, 155a.

The carriage-moving motor 150 and the hoisting motors 130 and 140 may be supplied with current and started, stopped and controlled by any suitable means (automatic, semi-automatic, or manual) such as commonly used in the travelling crane or travelling hoist art.

As shown in Figs. XV, XVI and XVII, the adhesive-applying means 116 comprises a roll 156 revolving in a glue vat or tank 157, and mounted on a shaft 158. This roll 156 is driven by an (electric) motor 160 through reduction gearing 161, a shaft 162 mounted in bearing brackets 163 on the tank 157, and a belt and pulley connection 164 or the like to the roll shaft 158. The roll shaft 158 has its bearings in arms 165, 165 pivoted on the shaft 162, at either end of the vat 157. The roll shaft 158 also has bearings 166, 166 that can move up and down in guides 167, 167 and rest on helical compression springs 168, 168 in said guides.

In practice, the handling apparatus 110 will start on its cycle of operation some time before the rest of the apparatus has completed its cycle. From the position shown in Fig. XV, the device 110 moves rearward across the rails 24 till it is directly over the car 111, which may be regarded as the starting position for its cycle of operations.

The suction device 120 is lowered on the pile of backing sheets B on the car 111—the structure 136 remaining raised—and picks up the top sheet. Coming forward, the device 110 drags the sheet B across the glue device 116, coating the lower side of the sheet with glue. The device 110 stops over the table 20,—which by this time has returned to the full-line position of Figs. I, II and XV with a cut up sheet S,—and the vacuum device 120 is lowered, laying the glued backing sheet B on the cut pieces. The weight 136 is lowered, causing retraction of the pins 93 as already described and settling down and resting on the device 120 where it remains long enough for the glue to stick to the cut pieces thoroughly, or even to dry more or less. Then the weight 136 and the device 120 are successively raised, picking up the completed board from the table 20. The device 110 comes on forward over the car 113, and the device 120 descends (the weight 136 remaining raised) and deposits the completed board on the car 113. Then the device 120 rises and the device 110 returns rearward over the car 111, ready for a repetition of the cycle.

Having thus described my invention, I claim:

1. Apparatus of the character described comprising a gang of rotary disc cutters, and a table for material to be cut, said table and said cutter gang being shiftable and turnable relative to one another for the taking of cuts in various positions and angular relations in said material and the table being provided with means for preventing displacement of the cut material.

2. Apparatus of the character described comprising horizontal ways and a carriage movable along them, a table turnable on said carriage, a gang of rotary disc cutters over said ways for taking cuts in material on said table, and means for shifting said carriage along said ways under and out from under said gang of cutters and for turning said table on said carriage, the said table being provided with means for preventing displacement of the cut material.

3. Apparatus of the character described comprising horizontal ways and a carriage movable along them, a table turnable on said carriage, upright pins in said table movable upward into anchoring engagement with material thereon, a gang of rotary disc cutters over said ways for taking cuts in material on said table and means associated with said gang for holding material down on the table between the cuts therein, means for shifting said carriage along said ways under and out from under said gang of cutters and for turning said table on said carriage, and means for driving said pins into anchoring engagement with the material on the table as the latter moves under the cutters and holding the material down to receive the pins.

4. Apparatus of the character described comprising a frame with a series of parallel shafts therein and individual motors for the shafts mounted on said frame, at opposite sides thereof for alternate shafts, interlapping rotary disc cutters on said shafts; and a table for material to be cut, said frame and said table being automatically shiftable and turnable to predetermined positions relative to one another for the taking of cuts in various positions and angular relations in said material.

5. Apparatus of the character described comprising a frame with a series of parallel shafts therein and individual motors for the shafts mounted on said frame, at opposite sides thereof for alternate shafts, interlapping rotary disc cutters on said shafts; a table for material to be cut, said frame and said table being shiftable and turnable relative to one another for the taking of cuts in various positions and angular relations in said material, anchor pins in said table for anchoring the material between cuts, and means carried by the frame for holding the material against the table between cuts.

6. Apparatus of the character described comprising a gang of rotary disc cutters movable up and down, and a table for material to be cut automatically shiftable and turnable to predetermined positions under said cutters for the taking of cuts in various positions and angular relations in said material.

7. Apparatus of the character described comprising a gang of rotary disc cutters movable up and down, a table for material to be cut shiftable and turnable under said cutters, when they are elevated, means associated with said table for anchoring a sheet to be cut at a multiplicity of points and for preventing displacement of the cut material, and means associated with said cutters for holding the sheet down on the table while being cut.

8. Apparatus of the character described comprising horizontal ways and a carriage movable along them, a table turnable on said carriage, vertical ways and a frame with a gang of rotary disc cutters movable up and down said vertical ways over said horizontal ways, raising and lowering means for said frame, means for shifting said carriage along said horizontal ways, means for turning said table on said carriage, and means for operating said raising and lowering, shifting, and turning means in correlation.

9. In a method of fabricating acoustical material having its surface broken by a multiplicity of parallel channels forming a recurrent pattern, the improvement which consists in cutting a plurality of said channels simultaneously in accurate, predetermined positions.

10. The method of fabricating acoustical material having its surface broken by sets of parallel channels, the sets being angularly disposed with respect to each other so as to form a recurrent pattern of polygonal units, which comprises cutting a plurality of channels comprised in one of said sets simultaneously in accurate, predetermined positions, and repeating the cutting operation in forming the remaining set or sets until the pattern is completed.

11. The method of fabricating acoustical material having its surface broken by sets of parallel channels, the sets being angularly disposed with respect to each other so as to form a recurrent pattern, which comprises moving the material transversely relative to a plurality of channel-cutting means so as to cut a plurality of channels comprised in one of said sets, automatically changing the angular position of the board to a predetermined position in the transverse plane to correspond with the angular relationship between parallel sets of channels, and cutting a plurality of channels comprised in another of said sets.

12. The method of fabricating acoustical material having its surface broken by sets of parallel channels, the sets being angularly disposed with respect to each other so as to form a recurrent pattern of polygonal units, which comprises cutting acoustical material to provide, simultaneously, a plurality of channels comprised in one of said sets, in accurate, predetermined positions, repeating the cutting operation in forming the remaining set or sets until the pattern is completed, and maintaining the cut units of material in substantially their original positions relative to one another.

In testimony whereof, I have hereunto signed my name at Trenton, New Jersey, this 29th day of August, 1929.

FRANCIS S. FARLEY.